US008138709B2

(12) United States Patent
Messersmith et al.

(10) Patent No.: US 8,138,709 B2
(45) Date of Patent: Mar. 20, 2012

(54) CONTROL METHOD AND SYSTEM

(75) Inventors: David M. Messersmith, Kenosha, WI (US); John Herman Blakely, Weaverville, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1043 days.

(21) Appl. No.: 11/897,870

(22) Filed: Aug. 31, 2007

(65) Prior Publication Data

US 2009/0058351 A1 Mar. 5, 2009

(51) Int. Cl.
*G01P 3/00* (2006.01)
*H02P 1/28* (2006.01)
(52) U.S. Cl. ......... 318/779; 318/799; 318/461; 324/178
(58) Field of Classification Search .............. 318/727, 318/778, 779, 807–809, 461, 799–805; 323/238, 323/321, 901; 324/160–166, 177–180
See application file for complete search history.

(56) References Cited

U.S. PATENT DOCUMENTS

| | | | | |
|---|---|---|---|---|
| 4,013,937 A | * | 3/1977 | Pelly et al. ................. | 363/10 |
| 4,124,885 A | * | 11/1978 | Nordby ........................ | 363/57 |
| 4,385,251 A | | 5/1983 | Mallick et al. | |
| 4,405,873 A | | 9/1983 | Nondahl | |
| 4,490,780 A | * | 12/1984 | Nondahl ....................... | 363/87 |
| 4,581,696 A | | 4/1986 | Gyugyi et al. | |
| 4,856,965 A | | 8/1989 | Katsuie et al. | |
| 5,068,811 A | * | 11/1991 | Johnston et al. ............ | 700/297 |
| 5,187,419 A | * | 2/1993 | DeLange ...................... | 318/805 |
| 5,347,277 A | | 9/1994 | Nondahl et al. | |
| 5,510,687 A | | 4/1996 | Ursworth et al. | |
| 5,859,514 A | * | 1/1999 | Chouffier et al. ............. | 318/432 |
| 6,038,155 A | * | 3/2000 | Pelly ........................... | 363/129 |
| 6,172,498 B1 | | 1/2001 | Schmidt et al. | |
| 6,218,749 B1 | | 4/2001 | Nondahl et al. | |
| 6,351,397 B1 | * | 2/2002 | Sawa et al. .................. | 363/50 |
| 6,504,275 B2 | | 1/2003 | Nondahl et al. | |
| 7,227,326 B1 | * | 6/2007 | Lu et al. ...................... | 318/461 |
| 7,345,449 B2 | * | 3/2008 | Barie et al. .................. | 318/779 |
| 7,358,700 B2 | * | 4/2008 | Qian et al. ................... | 318/809 |
| 2003/0205989 A1 | * | 11/2003 | Garrigan et al. ............. | 322/28 |
| 2007/0046247 A1 | * | 3/2007 | Barie et al. .................. | 318/799 |
| 2007/0070557 A1 | | 3/2007 | Maclennan et al. | |
| 2009/0058341 A1 | * | 3/2009 | Lu et al. ...................... | 318/504 |

OTHER PUBLICATIONS

Chapman, "Electric Machinery Fundamentals," Third Edition, McGraw-Hill Publishing, New York, 1999. Appendix A explains a three-phase circuit. Specifically, pp. 652-659 explains the relationship of phase quantity and line quantity between a delta-circuit configuration and a Y-circuit configuration.
U.S. Appl. No. 11/521,018, filed Sep. 14, 2006 by Wei S. Qian et al.
SMC PIus™, Smart Motor Controller: Preset Slow Speed Option Manual. (Bulletin 150) Allen-Bradley Publication 150-807US dated Oct. 1992.
SMC PIus™, Smart Motor Controller: Accu-Stop™ Option Manual. (Bulletin 150) Allen-Bradley Publication 150-809US dated Oct. 1992.
Zhao Kaiqi, et al., "Discrete Variable Frequency Soft Starting on DSP-based Voltage Controller-Fed IM Drive," *Industrial Electronics Society IECON '03, The 29th Annual of the IEEE*, vol. 1, Nov. 2-6, 2003, pp. 758-763.

* cited by examiner

*Primary Examiner* — Eduardo Colon Santana
(74) *Attorney, Agent, or Firm* — Fletcher Yoder P.C.; Alexander R. Kuszewski; John M. Miller

(57) ABSTRACT

Systems, methods, and devices are disclosed, including an induction-motor controller that has a motor controller configured to receive alternating current (AC) power with a voltage that varies generally sinusoidally and transmit the AC power during a conduction angle of a cycle of the AC power. In some embodiments, the conduction angle varies generally sinusoidally at a lower frequency than the AC power, and the motor controller may be configured to not transmit the AC power outside of the conduction angle.

20 Claims, 4 Drawing Sheets

CONTROL METHOD AND SYSTEM

BACKGROUND

The invention relates generally to controllers and, more specifically, in certain embodiments, to induction-motor controllers.

In many applications, it is desirable to tailor electrical power to elicit a particular response from a load. The response of the load may be affected by a variety of electrical parameters, such as frequency, amplitude, phase angle, wave shape, and other aspects of time-varying electrical currents, and these parameters may be adjusted to achieve useful ends. For example, a particular frequency and amplitude of AC electrical power may be used to rotate an induction motor (or other type of motor) at a certain speed, in a certain direction, or with a certain torque. In some situations, however, the electrical power is received at a fixed, standard frequency waveform, such as 60 Hz from a wall outlet, and the desired load response corresponds to some other frequency or waveform (or other electrical parameter).

BRIEF DESCRIPTION

The present invention provides a motor control technique designed to respond to such issues. Some embodiments of the present technique provide for an induction-motor controller that includes a motor controller configured to receive alternating current (AC) power with a voltage that varies generally sinusoidally and transmit the AC power during a conduction angle of a cycle of the AC power. In some embodiments, the conduction angle varies generally sinusoidally at a lower frequency than the AC power, and the motor controller may be configured to not transmit the AC power outside of the conduction angle.

In another aspect, certain embodiments of the present technique provide a method for controlling an electric motor. This method includes generating a plurality of reference values corresponding to a waveform having a frequency based upon a command frequency, applying AC incoming power to a plurality of solid state switches, switching the switches in accordance with timing based upon the reference values to generate output power at the waveform frequency, and applying the output power to a motor.

In another aspect, the present technique provides a method of controlling a motor that includes applying incoming AC power to a switch, providing a sinusoidal reference value having a reference frequency, and switching the switch during a conduction angle of the incoming cycle. The size of the conduction angle may depend on the magnitude of the sinusoidal reference value. In some embodiments, the incoming AC power has a voltage that varies sinusoidally through an incoming cycle at an incoming frequency that is greater than the reference frequency.

DRAWINGS

These and other features, aspects, and advantages of the illustrated invention will become better understood when the following detailed description is read with reference to the accompanying drawings in which like characters represent like parts throughout the drawings, wherein.

DETAILED DESCRIPTION

Figure 1:
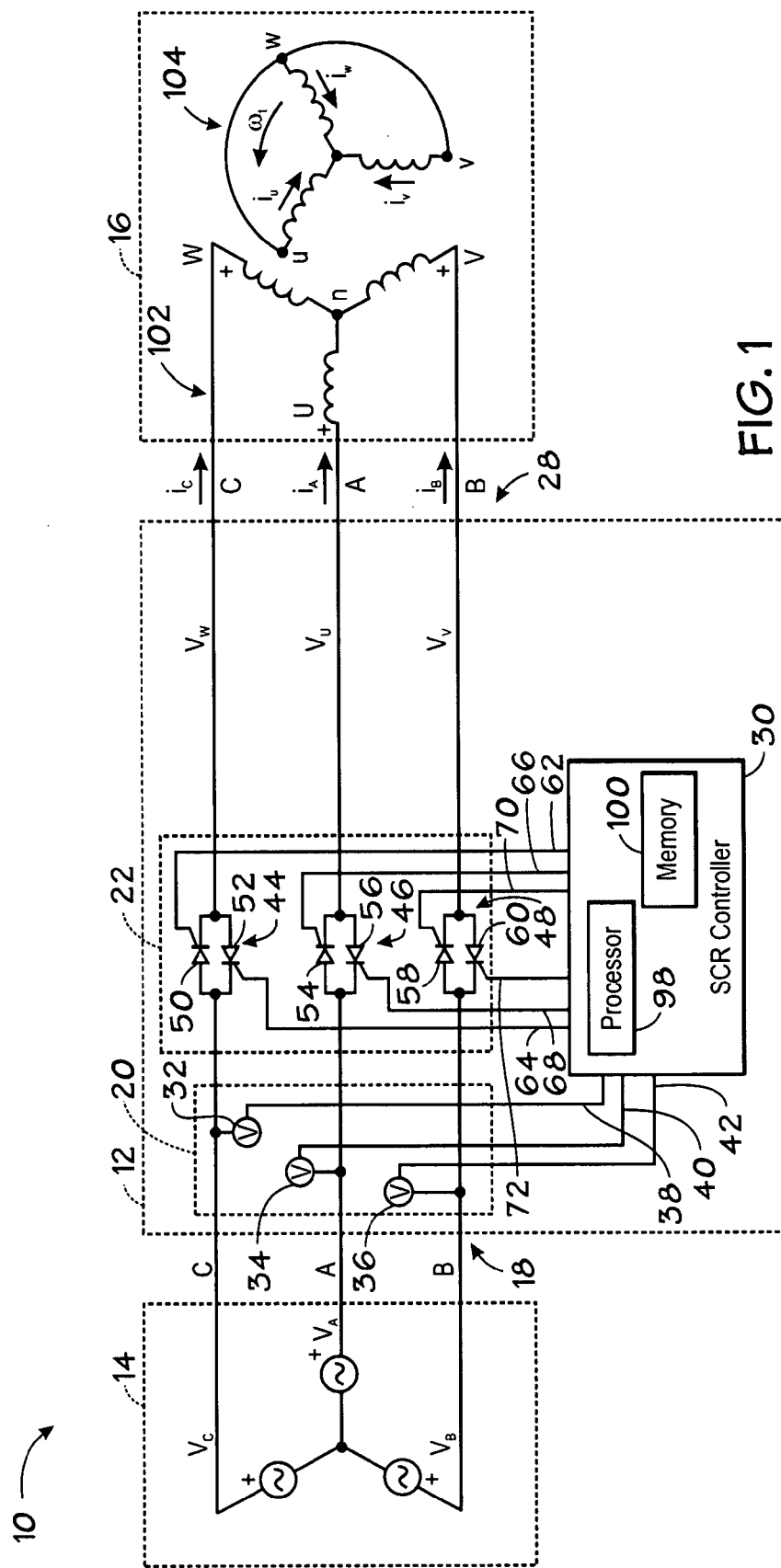
FIG. 1 illustrates an exemplary induction motor system in accordance with an embodiment of the present technique.

FIG. 1 depicts an example of an induction motor system 10 having a motor controller 12, a power supply 14, and an induction motor 16. As described further below, the illustrated controller 12 is capable of controlling various aspects of motor operation, such as speed and position, by selectively energizing one or more silicon-controlled rectifiers (SCRs). In some embodiments, the motor controller 12 may pulse-width modulate sinusoidal, input-power waveforms based on a lower-frequency reference or control waveform, thereby providing an output waveform with a frequency, phase, and amplitude tailored to a desired direction, speed, and torque. Prior to addressing the motor controller 12 in detail, the features of the power supply 14 will be explained.

The illustrated power supply 14 is a three-phase, 60 Hz power supply that outputs three sinusoidally varying voltages $V_A$, $V_B$, and $V_C$. Other embodiments may include power supplies 14 capable of outputting a different number of phases, a different frequency, and/or a different voltage waveform. In operation, currents driven by the voltages $V_A$, $V_B$, and $V_C$ flow through phase paths A, B, and C respectively between the power supply 14 and the motor controller 12.

The motor controller 12 of FIG. 1 is configured to accept and control currents driven by the three sinusoidally varying voltage waveforms $V_A$, $V_B$, and $V_C$ by selectively transmitting a portion of each voltage cycle. To accomplish this, the illustrated motor controller includes a power input 18, a supply-cycle monitor 20, a switching unit 22, a power output 28, and an SCR controller 30. The illustrated power input 18 continues the phase paths A, B, and C into the motor controller 12 from the power supply 14. The phase paths A, B, and C extend through the motor controller 12, and the power output 28 extends the phase paths A, B, and C out of the motor controller 12 to the induction motor 16.

The exemplary supply-cycle monitor 20 includes three voltage sensors 32, 34, and 36 coupled to each pair of the three phase paths A, B, and C. In the presently discussed embodiment, the voltage sensors 32, 34, and 36 couple to the phase paths A, B, and C between the power supply 14 and the switching unit 22. The illustrated voltage sensors 32, 34, and 36 are configured to sense line-to-ground voltages of the phase paths A, B, and C on the power supply 14 side of the switching unit 22. Other embodiments may sense line-to-line voltages or line currents. Supply voltage signals 38, 40, 42 communicatively couple the voltage sensors 32, 34, and 36 respectively to the SCR controller 30 and indicate the sensed voltages or the phase of the sensed voltages. The illustrated supply-cycle monitor 20 is integrated within the motor controller 12.

In other embodiments, a portion of the supply-cycle monitor 20 may be separate from motor controller 12 and, in some embodiments, integrated into the power supply 14. Further, some embodiments may include fewer voltage sensors 32, 34, or 36, such as two or one, which is not to suggest that other features discussed herein may not also be omitted. For instance, in embodiments having one voltage sensor 32 constituting the supply-cycle monitor 20, the SCR controller 30 may estimate the voltage of the non-sensed phases by adding or subtracting 120 degrees to the phase angle of a sensed voltage. Alternatively, or additionally, the supply-cycle monitor 20 may include other circuitry adapted to synchronize subsequently discussed operations of the SCR controller 30 with the cycle of the power supply 14.

Currents on the phase paths A, B, and C may be regulated by the exemplary switching unit 22, which includes solid-state switches, thryristors, or SCR pairs 44, 46, and 48 having SCRs 50 and 52, 54 and 56, and 58 and 60, respectively. In the illustrated embodiment, each SCR pair 44, 46, and 48 is serially disposed on one of the phase paths A, B, and C, respectively. Within each exemplary SCR pair 44, 46, and 48, SCRs 50 and 52, 54 and 56, and 58 and 60 are oppositely oriented and connected in parallel to the phase paths A, B, and C, respectively. Gate signals 62, 64, 66, 68, 70, and 72 connect the SCR controller 30 to a gate of each of the SCRs 50, 52, 54, 56, and 60, respectively. While the illustrated embodiment does not employ an insulated gate bipolar transistor (IGBT) to modulate currents through the phase paths A, B, or C, other embodiments in accordance with the present technique may include IGBTs or other switching devices. For instance, in some embodiments, the switching unit 22 may include a matrix converter. SCRs and their supporting circuitry, however, are often less expensive.

The illustrated SCR controller 30 includes a processor 98 and memory 100. The processor 98, memory 100, and their respective sub-components may be partially or entirely integrated into a single device, or separately disposed. The processor 98 may include a microprocessor, a microcontroller, and/or a digital signal processor (DSP), for instance. The illustrated memory 100 may include volatile memory, such as dynamic random access memory (DRAM), and/or non-volatile memory, such as magnetic storage, optical storage, and/or flash memory, for instance. The processor 98 may communicatively couple to both the memory 100 and signals 38, 40, 42, 62, 64, 66, 68, 70, and 72.

The induction motor 16 of FIG. 1 is coupled to the motor controller 12 via phase paths A, B, and C. The illustrated induction motor 16 includes a stator 102 and a rotor 104. The stator 102 typically includes a stator core constructed from a plurality of steel laminations and a plurality of windings coupled to each pair of the phase paths A, B, and C through the motor terminals U, V, and W. The rotor 104 may also include a plurality of windings, for example in certain types of traction motors, or a number of bars (such as 36) connected by end rings, for instance in a squirrel-cage rotor. In some embodiments, the rotor 104 may include a cast core with copper bars and end rings. The rotor may be concentrically disposed within stator 102 and rotateably supported, for instance by bearings. In FIG. 1, the direction of rotation and an angular position of the rotor is indicated by the arrow labeled ωt.

In operation, alternating currents through each of the phase paths A, B, and C create a rotating magnetic field in the induction motor 16. Through electromagnetic induction, the rotating magnetic field induces a current in the conductors of the rotor 104, which in turn creates a counterbalancing magnetic field that causes the rotor 104 to turn in the direction the field is rotating. Generally, the rotor 104 turns slightly slower than the rotating magnetic field so that the magnetic field induces currents in the rotor winding to produce torque.

The motor controller 12 may modulate currents $i_A$, $i_B$, and $i_C$ conducted by phase paths A, B, and C to control the starting and/or stopping performance of the induction motor 16. As the voltages $V_A$, $V_B$, and $V_C$ oscillate, the SCR controller 30 energizes the gates of the SCRs 50, 52, 54, 56, 58, and 60 during the portion of the voltage cycle in which the SCRs 50, 52, 54, 56, 58, and 60 are forward biased. By waiting to energize the gates for some time delay (or firing angle) after the SCRs 50, 52, 54, 56, 58, and 60 become forward biased, the SCR controller 30 may increase or decrease the currents $i_A$, $i_B$, and $i_C$ on phase paths A, B, and C. Generally, a longer delay reduces the portion of each power supply cycle that drives currents $i_A$, $i_B$, or $i_C$, and a shorter delay increases the portion of each power supply cycle that drives currents $i_A$, $i_B$, or $i_C$. To energize the gates of SCRs 50, 52, 54, 56, 58, and 60, the SCR controller may drive a pulse of current on gate signals 62, 64, 66, 68, 70, 72. Once the gates are energized and current starts to flow in two or more of the SCRs 50, 52, 54, 56, 58, and 60, each conducting SCR will continue conducting current until the current falls to zero, at which point it turns off until the next time its gate is energized. Thus, in some embodiments, the SCR controller 30 may adjust the time during each cycle of the power supply 14 at which the SCR pairs 44, 46, and 48 are turned on to control the power delivered to the induction motor 16. For example, in some embodiments, the motor controller 12 may gradually decrease the firing angle of each SCR pair 44, 46, and 48 to soft-start the induction motor 16.

Figure 2:
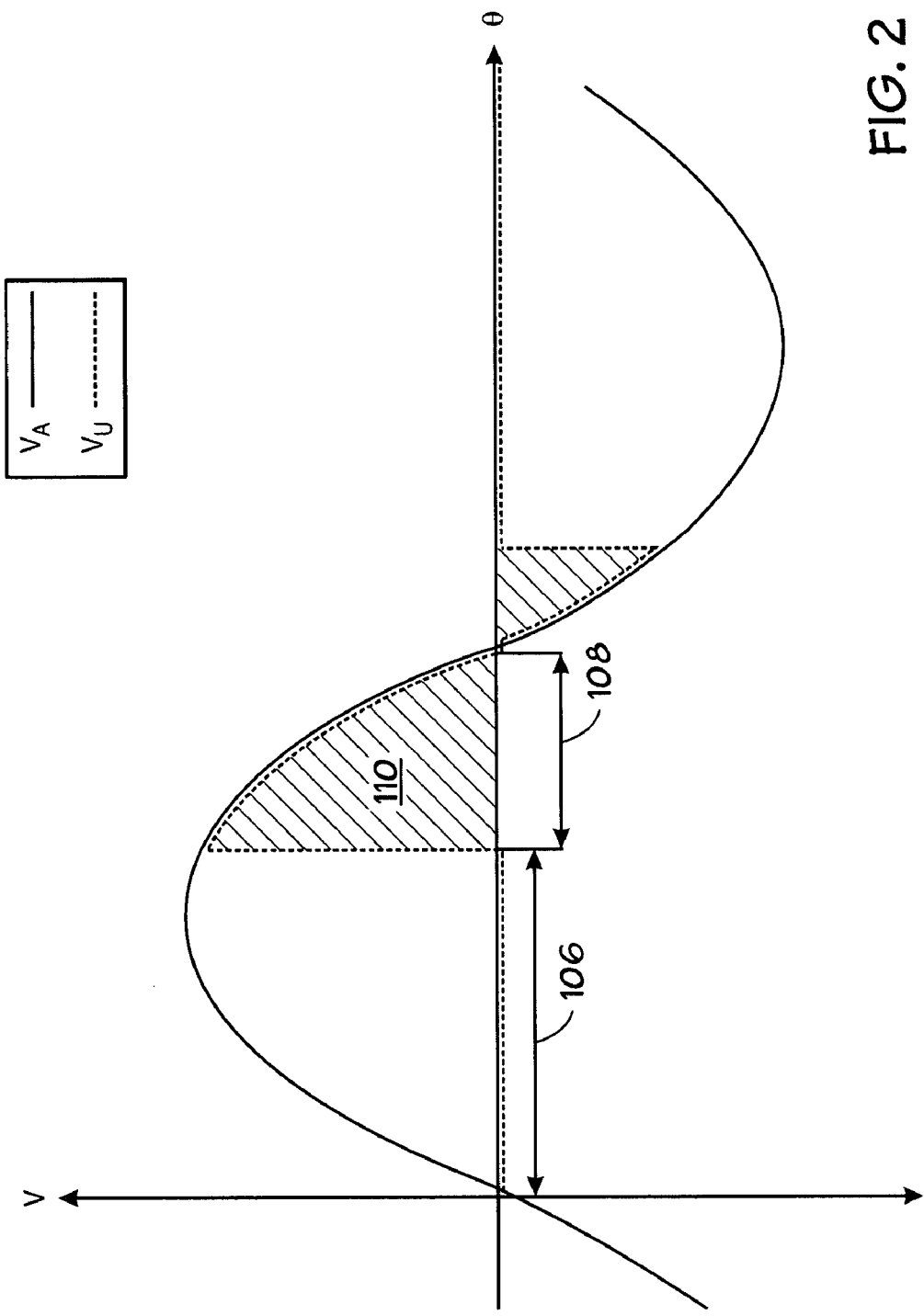
FIG. 2 illustrates one cycle of input and output voltage waveforms through a portion of the induction motor system of FIG. 1, in accordance with an embodiment of the present technique.

The operation of a single SCR 54 is illustrated by FIG. 2, which depicts input voltage $V_A$ and output voltage $V_U$ during a portion of a single cycle on phase path A. The abscissa of FIG. 2 corresponds to the phase angle of the input voltage $V_A$, i.e., θ, and the ordinate corresponds to voltage. As illustrated, the input voltage $V_A$ varies sinusoidally. The output voltage $V_U$, in the illustrated embodiment, is decoupled from the input voltage $V_A$ until the SCR 54 is energized at firing angle 106. After the SCR 54 is energized, it is conductive and remains so until current stops flowing, even if the firing voltage applied to its gate is removed. Consequently, after the SCR is turned on, $V_A$ is generally the same as $V_U$ until the SCR 54 becomes reverse biased and stops flowing current, at which point the SCR 54 turns off, thereby decoupling $V_A$ from $V_U$. The portion of each cycle during which the SCR is conductive is referred to as the conduction angle 108. The amount of volt-seconds conveyed through the SCR 54 corresponds to the area 110 defined by the curve of $V_U$. Thus, the volt-seconds applied to the motor 16 can be varied by increasing or decreasing the conduction angle.

Conduction angle adjustments can be used to provide output power with useful properties. For instance, by sinusoidally adjusting the conduction angle, a waveform of a desired frequency and amplitude can be provided, which can be used to drive the motor 16 to a desired position or velocity or with a desired torque. Thus, in some embodiments, the SCR controller 30 varies the conduction angle to control the operation of the motor 16.

Figure 3:
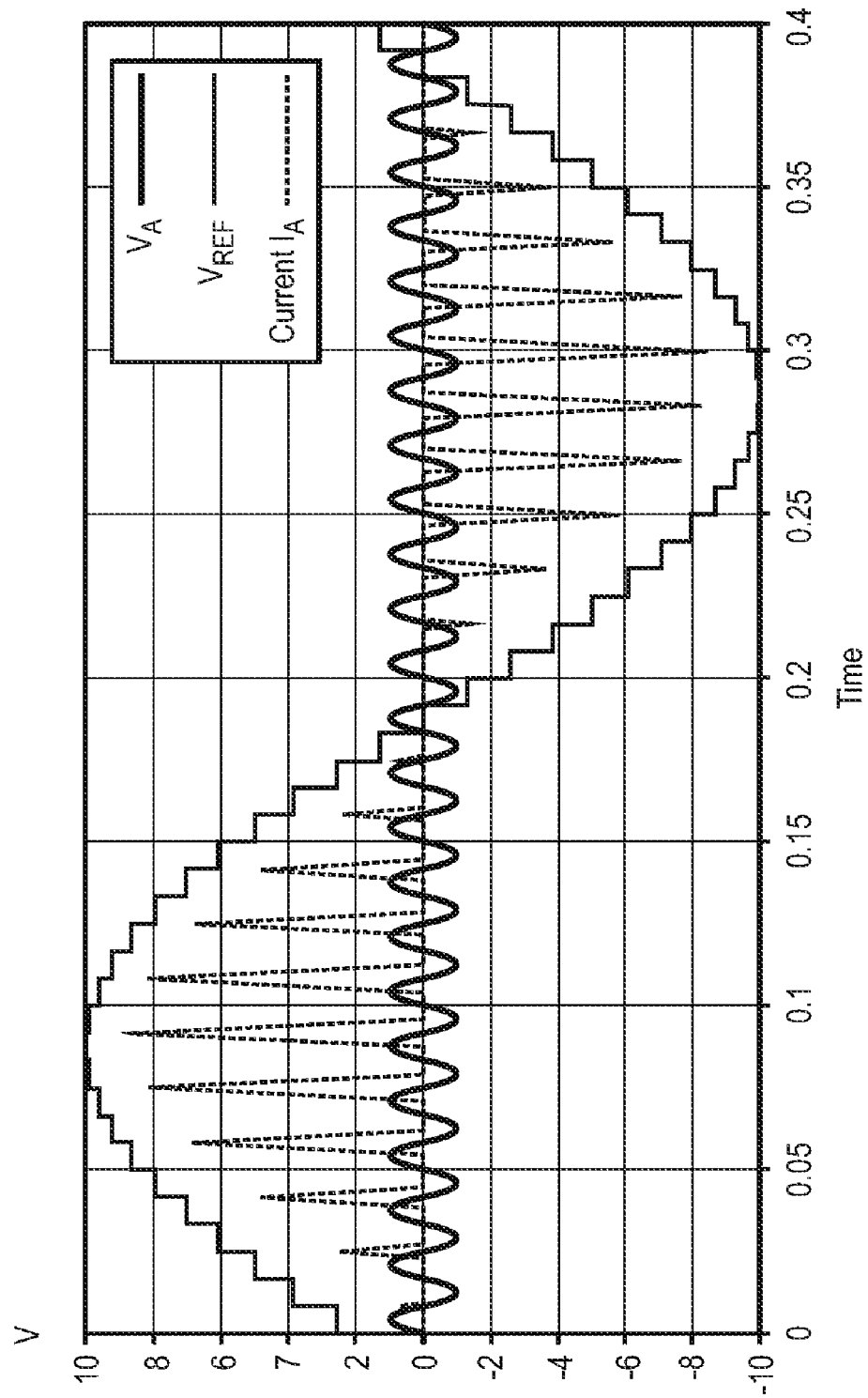
FIG. 3 illustrates voltages and currents in the induction motor system of FIG. 1 during a plurality of cycles, in accordance with an embodiment of the present technique.

FIG. 3 illustrates how some embodiments of the controller 30 (FIG. 1) control the motor 16. Specifically, FIG. 3 illustrates the relationship between a single phase voltage $V_A$, the phase current $I_A$, and a reference voltage $V_{REF}$ that modulates the conduction angle 108 (FIG. 2). It should be understood that, in FIG. 3, to clearly illustrate their relationship over time, $V_A$ and $V_{REF}$ are not drawn to the same voltage scale, since the peak magnitude of $V_A$, in some embodiments, is larger than $V_{REF}$. Because the reference voltage $V_{REF}$ controls the conduction angle 108, the frequency of the reference voltage $V_{REF}$ generally determines the motor speed, the amplitude of the reference voltage generally corresponds to motor torque, and the phase difference between the motor phase current and the reference voltage $V_{REF}$ determines the direction of the motor torque.

As illustrated by an examination of a single cycle of the phase voltage $V_A$ in FIG. 3, the controller 30 typically fires one of the two opposing SCRs in each SCR pair 44, 46, and 48 per cycle of the phase voltage $V_A$. In this embodiment, which SCR 54 or 56 is fired is generally determined by the sign of the reference voltage $V_{REF}$. If the reference voltage is positive, then the SCR 54 is fired at the appropriate firing angle when the phase voltage $V_A$ is positive, corresponding to the desired conduction angle, and if the reference voltage $V_{REF}$ is negative, then the SCR 56 is fired at the appropriate time when the phase voltage $V_A$ is negative. Thus, the sign of the reference voltage $V_{REF}$ may determine both which SCR 54 or 56 is fired and the half of the cycle of the phase voltage $V_A$ in which the SCR 54 or 56 is fired.

As indicated by the FIG. 3, over the cycle of the reference voltage $V_{REF}$, the reference voltage $V_{REF}$ modulates the phase current $I_A$. The larger of the magnitude of the reference voltage $V_{REF}$, the earlier the appropriate SCR 54 or 56 is fired, and the earlier the firing, the larger the conducting angle 108 and the larger the phase current $I_A$. The reference voltage can be mapped to a conducting angle with a variety of techniques, including the two examples described below.

In some embodiments, the conduction angle 108 is proportional to the reference voltage $V_{REF}$. Thus, the relationship between the conduction angle 108 and $V_{REF}$ may be expressed by the following equation (Equation 1), in which $\theta_{CA}$ represents the conduction angle and m and b represent constants that are empirically or analytically determined:

$$\theta_{CA}=m*V_{REF}+b \qquad \text{Equation 1.}$$

The result of equation 1 can be applied to an integral of a sine function representing the phase voltage $V_A$ to calculate an average voltage ($V_{AVERAGE}$) over one cycle of the phase voltage $V_A$. $V_{AVERAGE}$ corresponds to the area 110 divided by 360 degrees, i.e., one cycle of $V_A$. $V_{AVERAGE}$ produced by Equation 1 is approximately proportional to $V_{REF}$, however because the phase voltage $V_A$ is generally a sine wave, rather than a triangle wave, saw-tooth wave, or a square wave, the relationship is not exactly proportional.

In another embodiment, these two parameters, $\theta_{CA}$ and $V_{REF}$, may correspond in other ways that account for the sinusoidal nature of phase voltage $V_A$. For example, the conduction angle may be calculated with the following equation (Equation 2), in which C represents a scaling constant:

$$\theta_{CA}=\cos^{-1}(C*V_{REF}+1) \qquad \text{Equation 2.}$$

When a sine function is integrated between $\theta_{CA}$ and the next zero crossing, and the result is divided by 360 degrees, it produces a $V_{AVERAGE}$ that is proportional to $V_{REF}$. (This assumes that the phase voltage $V_A$ is sinusoidal). Increasing the degree to which these two values are proportional is believed to produce output power that more closely approximates a sine wave and reduces motor chatter.

The reference voltage $V_{REF}$ or its equivalent may be provided with a variety of techniques. For instance, in the illustrated embodiment, the reference voltage is updated periodically, at a rate that is greater than or equal to be firing rate of the controller 30, e.g. six times per supply cycle. The reference voltage may be an actual voltage, or it may be a value that varies sinusoidally, e.g., the firing angle 106 or conduction angle 108 or a corresponding delay may be calculated directly. For instance, six times or more per cycle of the phase voltage $V_A$, the controller 30 may calculate a reference value, the conduction angle 108, or the firing angle 106. The reference voltage $V_{REF}$ may be considered a type or expression of the reference value. This value may be calculated by the processor 98 or it may be retrieved from a lookup table stored in memory 100. In some embodiments, the controller 30 may receive the reference voltage $V_{REF}$ from an external source, such as a controller for a larger system in which the motor 16 operates.

The controller 30 may use the reference voltage to control each of the other phases in a manner similar to the way in which it controls phase voltage $V_A$. For example, the controller 30 may use a reference voltage with a positive, 120-degree phase shift relative to $V_{REF}$ to control the phase current $I_C$, and a reference voltage with a negative, 120-degree phase shift to control the phase current $I_B$.

In some embodiments, the controller 30 may calculate the reference voltage $V_{REF}$ or reference value based on a command from a user interface or system controller. For example, the controller 30 may determine a phase shift of the reference voltage $V_{REF}$ based on the position of the motor 16 and a desired direction of rotation, a frequency of the reference voltage $V_{REF}$ based on a desired speed of the motor 16, and an amplitude of the reference voltage $V_{REF}$ based on a desired torque to be applied by the motor 16.

Certain embodiments may vary the desired speed, torque magnitude, and torque direction in a predetermined fashion or in response to a feed-forward or feedback signal, such as a target speed from a system controller and a speed feedback signal from the motor 16. In some embodiments, the controller 30 may exercise P, PI, or PID feedback control over position, torque, or speed. Additionally, or alternatively, the controller 30 may soft start (i.e., gradually ramp up) the motor 16 by gradually increasing the frequency of the reference voltage $V_{REF}$. Similarly, the controller 30 may initiate movement of the motor 16 with a relatively large reference voltage $V_{REF}$ amplitude, corresponding to a large torque, and then decrease the amplitude of the reference voltage $V_{REF}$ after the motor 16 begins moving. Some embodiments may "home" the motor 16 to a certain position before initiating movement by exercising feedback control or feedforward control of motor position and adjusting $V_{REF}$ appropriately.

Figure 4:
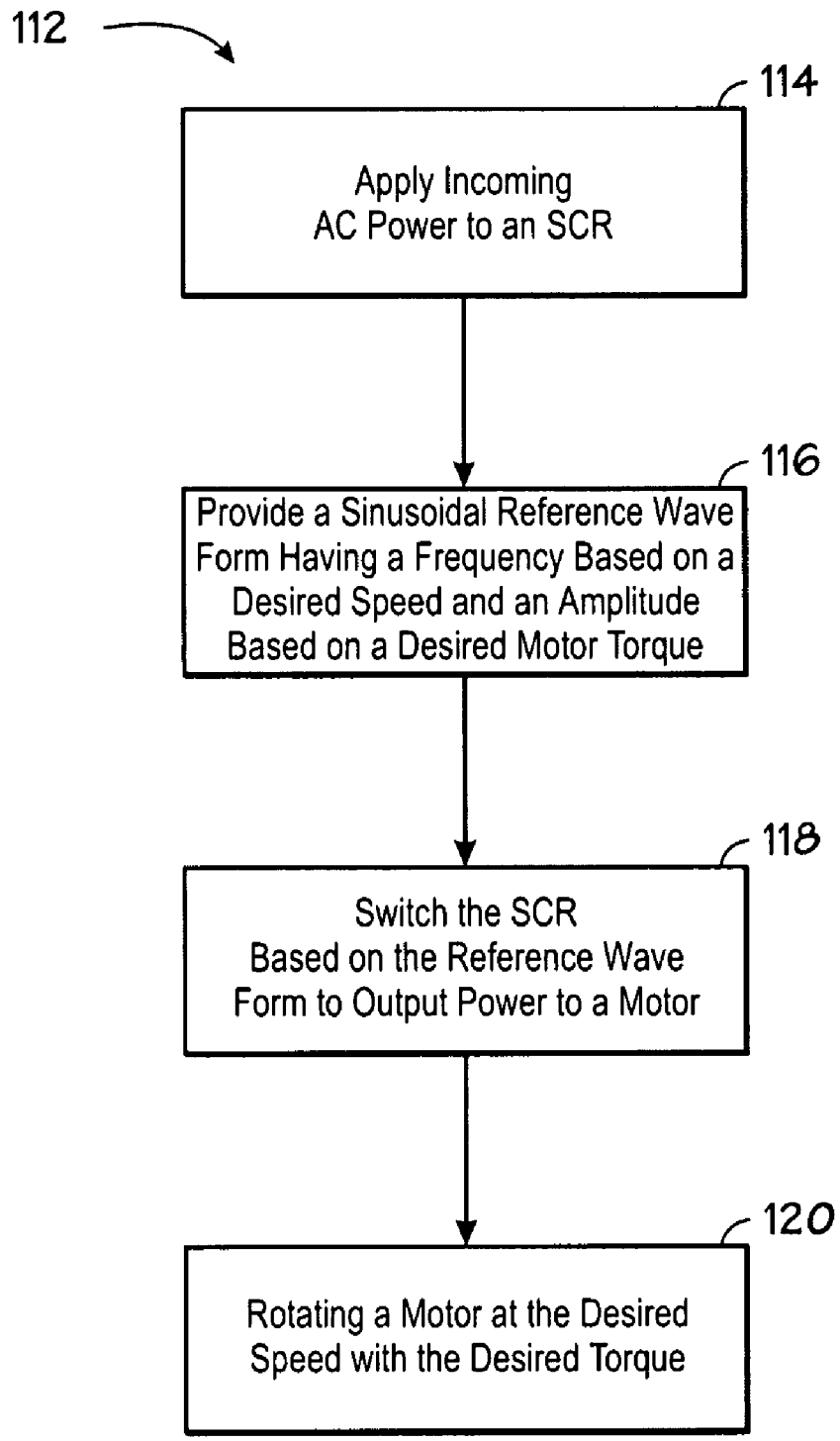
FIG. 4 illustrates an example of a control process in accordance with an embodiment of the present technique.

FIG. 4 illustrates an example of a process 112 for controlling electrical power. The illustrated process begins with applying incoming AC power to an SCR, as illustrated by block 114. Applying incoming AC power to an SCR may include applying sinusoidally varying voltage to parallel, oppositely oriented SCRs, and it may include applying three phases of AC power to three pairs of such SCRs.

The process 112 also includes providing a sinusoidal reference waveform having a frequency based on a desired motor speed and an amplitude based on a desired motor torque, as illustrated by block 116. Providing a sinusoidal reference wave may include selecting a phase shift for the reference waveform based on a desired direction of rotation and position of the motor. In some embodiments, the reference waveform may be physically expressed as a voltage or current, which may be an analog signal or which may vary in a stepwise or digital fashion. In some embodiments, the sinusoidal reference waveform may be a sinusoidally varying value from an equation that determines when to fire the SCR. Providing a sinusoidal reference waveform may also include providing generally matching sinusoidal reference waveforms that are phase shifted for each incoming AC power phase.

The process 112 includes switching the SCR based on the reference waveforms to output power to a motor, as illustrated by block 118. Switching the SCR may include determining which SCR in an SCR pair to switch based on whether the reference waveform is positive or negative. Switching may also include determining which half of a cycle of the incoming AC power to switch the SCR. Additionally, switching the SCR may include determining a conduction angle or a firing angle based on an amplitude of the waveform. In some embodiments, a portion of substantially each cycle of incoming AC power may be transmitted when the motor is being powered.

The process of 112 includes rotating a motor at the desired speed with the desired torque as illustrated by block 120. Rotating the motor may include outputting a pulse width modulated portion of the incoming AC power to the motor, where the width of the pulse varies in a sinusoidal fashion. Rotating the motor at a desired speed with the desired torque may also include measuring or determining the motor speed and exercising feedback control by adjusting the frequency and/or amplitude of the reference waveform.

In summary, certain embodiments described above may selectively transmit portions of an incoming sinusoidal AC waveform in a manner that varies sinusoidally to provide output power that varies sinusoidally at a lower frequency than the incoming waveform, e.g., less than half. As a result, in some embodiments, a load, such as an induction motor, may receive power that is tailored to a desired speed, direction, or torque.

Certain types of motor drives tailor the frequency of AC power delivered to the motor according to a desired speed, however many of these variable frequency motor drives include expensive components. Some drives use an inverter, which often includes a rectifier to convert supplied AC power to DC power and insulated gate bipolar transistors (IGBTs) to pulse-width modulate the DC power at a desired frequency. The cost of the IGBTs and the rectifier can add to the cost of the system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A device, comprising:
   a controller configured to receive alternating current (AC) power with a phase voltage that varies generally sinusoidally and transmit the AC power during a conduction angle of a cycle of the AC power, wherein the conduction angle varies generally sinusoidally at a lower frequency than the AC power and is controlled by a controllable reference voltage, and wherein the controller is configured not to transmit the AC power outside of the conduction angle.

2. The device of claim 1, comprising a silicon controlled rectifier (SCR) configured to conduct the AC power during the conduction angle.

3. The device of claim 2, comprising another parallel SCR that is oppositely oriented.

4. The device of claim 3, wherein the controller is configured to energize one SCR or the other SCR based on whether the controllable reference voltage is positive or negative.

5. The device of claim 1, wherein the controller is configured to receive three phases of AC power, each characterized by a phase voltage that varies generally sinusoidally, and transmit each phase of AC power during a conduction angle for each phase, wherein the conduction angle for each phase varies generally sinusoidally.

6. The device of claim 1, comprising:
   a first, second, and third SCR pairs, wherein each SCR pair is coupled to a first phase path, a second phase path, or a third phase path, respectively;
   a processor configured to energize SCRs in the SCR pairs according to a first controllable reference voltage, a second controllable reference voltage, or a third controllable reference voltage, wherein the first controllable reference voltage, the second controllable reference voltage, and the third controllable reference voltage vary generally sinusoidally; and
   an induction motor coupled to the controller.

7. A method for controlling an electric motor, the method comprising:
   determining a plurality of controllable reference voltages corresponding to a waveform having a waveform frequency based upon a command frequency;
   applying AC incoming power to a plurality of solid-state switches;
   switching the switches in accordance with timing based upon the controllable reference voltages to generate output power at the waveform frequency, wherein the timing corresponds to a conduction angle of the AC incoming power that varies generally sinusoidally at a lower frequency than the AC incoming power; and
   applying the output power to a motor.

8. The method of claim 7, wherein the timing is based upon a delay after a zero crossing of the AC incoming power, the delay being a function of the magnitude of the controllable reference voltages.

9. The method of claim 8, wherein the delay after the zero crossing is shorter for greater magnitudes of the controllable reference voltages.

10. The method of claim 8, wherein the delay is proportional to the plurality of controllable reference voltages.

11. The method of claim 8, wherein the delay is proportional to an integral of a sinusoid corresponding to the AC incoming power.

12. The method of claim 11, wherein the motor is an induction motor.

13. The method of claim 7, comprising increasing the amplitude of the waveform in response to a command to provide more motor torque.

14. The method of claim 7, comprising increasing the frequency of the waveform in response to a command to increase motor speed.

15. The method of claim 7, comprising adjusting a phase shift of the waveform relative to a motor position in response to a command to change a direction of motor torque.

16. The method of claim 7, wherein the switches comprise SCRs.

17. A method of controlling electrical power, the method comprising:
   applying incoming AC power to a switch, wherein the incoming AC power has a phase voltage that varies generally sinusoidally through an incoming cycle at an incoming frequency;
   providing a generally sinusoidal controllable reference voltage having a reference frequency, wherein the reference frequency is less than the incoming frequency; and
   switching the switch during a conduction angle of the incoming cycle, wherein the size of the conduction angle depends on the magnitude of the sinusoidal controllable reference voltage.

18. The method of claim 17, wherein the switch comprising oppositely oriented, parallel SCRs.

19. The method of claim 18, wherein switching comprises energizing one SCR or the other based on whether the sinusoidal controllable reference voltage is positive or negative.

20. The method of claim 17, comprising applying outgoing, pulse-width-modulated AC power having a frequency that corresponds to the reference frequency to an induction motor.

* * * * *